United States Patent
Planelid et al.

(10) Patent No.: US 6,418,219 B1
(45) Date of Patent: Jul. 9, 2002

(54) METHOD AND DEVICE IN TELECOMMUNICATIONS NETWORKS

(75) Inventors: Lars Planelid, Skoghall; Mikael Kilhage, Karlstad, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/174,784

(22) Filed: Oct. 19, 1998

(30) Foreign Application Priority Data

Oct. 20, 1997 (SE) ............................................. 9703815

(51) Int. Cl.⁷ ............................. H04M 3/42; H04M 7/00
(52) U.S. Cl. ............................. 379/221.13; 379/207.12; 379/333
(58) Field of Search ................................. 379/207, 211, 379/220, 221, 219, 272, 279, 207.12, 211.02, 220.01, 221.01, 221.13, 333

(56) References Cited

U.S. PATENT DOCUMENTS

| | | | |
|---|---|---|---|
| 4,754,479 A | * 6/1988 | Bicknell et al. | ............. 379/211 |
| 4,754,480 A | 6/1988 | Mattis et al. | |
| 5,454,032 A | 9/1995 | Pinard et al. | |
| 5,930,348 A | * 7/1999 | Regnier et al. | ......... 379/221.01 |
| 5,991,377 A | * 11/1999 | Malik | .......................... 379/207 |
| 5,991,388 A | * 11/1999 | Sonnenberg | ................. 379/220 |
| 5,995,609 A | * 11/1999 | Melnyk et al. | ............... 379/207 |
| 6,002,757 A | * 12/1999 | Williams et al. | ............. 379/207 |
| 6,134,316 A | 10/2000 | Kallioniemi et al. | .. 379/220.01 |

FOREIGN PATENT DOCUMENTS

| | | |
|---|---|---|
| EP | 0 433 465 | 6/1991 |
| EP | 0 738 093 | 10/1996 |
| EP | 0 810 800 | 12/1997 |

* cited by examiner

*Primary Examiner*—Harry S. Hong
(74) *Attorney, Agent, or Firm*—Burns, Doane, Swecker & Mathis, L.L.P.

(57) ABSTRACT

An address registration device is used in a telecommunications network in which subscribers are connected to remote subscriber stages, RSSs. The RSSs are connected to local exchanges. The address registration device includes a first table providing information about the RSS to which each subscriber is connected, and a second table providing information about the local exchange to which each RSS is connected. To move an RSS with all subscribers connected to it, from a local exchange to another, the table entry for this RSS in the second table is changed. The address registration device may be included in a supervision node monitoring the state of the local exchanges to moves an RSS from one local exchange to another automatically when needed.

8 Claims, 4 Drawing Sheets

| Subscriber | RSS |
|---|---|
| 115 | 107 |
| 116 | 109 |
| 117 | 109 |
| 119 | 111 |
| 120 | 113 |
| 121 | 113 |
| | |

FIG. 3A

| RSS | Local Exch. |
|---|---|
| 107 | 101 |
| 109 | 102 |
| 111 | 103 |
| 113 | 103 |
| | |

FIG. 3B

METHOD AND DEVICE IN TELECOMMUNICATIONS NETWORKS

TECHNICAL FIELD

The present invention relates to telecommunications systems and in particular to telecommunications systems in which remote subscriber stages are used.

BACKGROUND

Often in telecommunications networks remote subscriber stages (RSS) are used to move some of the switching and concentration functions closer to the subscribers. Typically, one RSS can handle approximately 2000 subscribers.

The requirements for number portability in telecommunications networks increases as people move more often. Also, it is desirable to be able to move groups of subscribers fast, to minimize the work and the disturbance in the network. Groups of subscribers may have to be moved, for example, when a node in the network is being replaced. It is also desirable to be able to move groups of subscriber temporarily when an exchange or an RSS is out of service.

Solutions currently exist for number portability in networks when the subscribers are connected to a local exchange, either directly or via a connection node. Co-pending U.S. patent application Ser. No. 08/733,390 describes a solution in which a telecommunications network comprises an address table in which the number of each subscriber is linked to the identity of the exchange to which the subscriber is connected.

European patent application EP 0 738 093 A2 describes an address node in a telecommunications network linking the logical number of a subscriber to the number denoting a physical connection. Thus, when a subscriber moves, only the number to the physical connection has to be changed in the table, while the subscriber's logical number may be kept.

It is known how to change the numbers of subscribers belonging to the same number series.

None of the above mentioned solutions solve the problem of moving a lot of subscribers connected to an RSS.

SUMMARY

It is an object of the present invention to enable the moving of many subscribers in a telecommunications network to another exchange, irrespective of their telephone number.

It is another object of the invention to enable the efficient handling of subscribers in a remote subscriber stage.

It is another object of the invention to enable the moving of many subscribers in a telecommunications network to another exchange without having to change their telephone numbers.

It is yet another object to enable the moving of many subscribers in a telecommunications network fast and in one operation.

It is still another object to minimize the disturbances in the network when moving many subscribers in a telecommunications network.

These objects are achieved according to the invention by an address registration means for use in a telecommunications network in which subscribers are connected to remote subscriber stages, said remote subscriber stages being connected to local exchanges, comprising a first table providing information for subscribers connected to an RSS, about the RSS to which each subscriber is connected, and a second table providing information about the local exchange to which each RSS is connected.

An RSS, with all subscribers connected to is, is moved from a local exchange to another local exchange by changing the table entry for this RSS in the second table.

The address registration means may be comprised in a supervision node monitoring the state of all local exchanges connected to it. If one local exchange fails, the supervision node may initiate the move of one or more RSSs connected to this local exchange to another local exchange.

The invention offers the following advantages: A large number of subscribers connected to an RSS can be moved efficiently by moving the RSS to another local exchange. This may be used, for example, to move subscribers between operators. With the solution according to the invention, standby exchanges may be used for important subscribers, such as the police to make connections to these subscribers more reliable.

BRIEF DESCRIPTION OF THE DRAWINGS

FIGS. 3A and 3B show the address tables according to the invention.

DETAILED DESCRIPTION OF EMBODIMENTS

Figure 1:
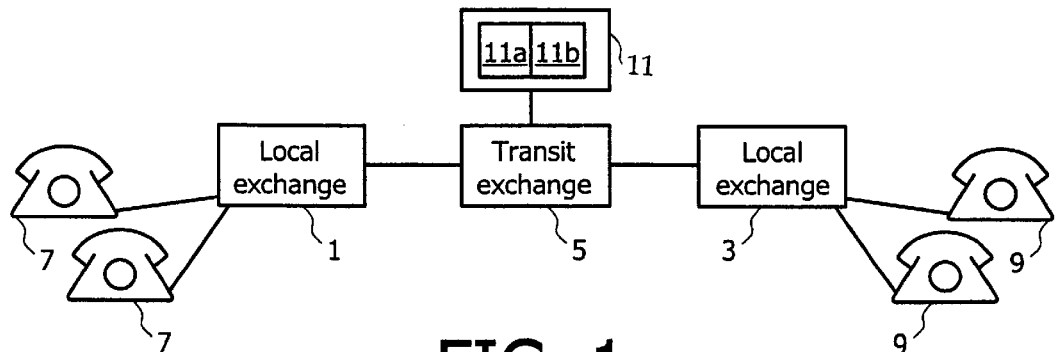
FIG. 1 is a block diagram of a prior art telecomununications network.

FIG. 1 shows a telecommunications network as disclosed in the above mentioned co-pending U.S. application Ser. No. 08/733,390. A first and a second local exchange 1,3 are connected to each other through a transit exchange 5. A number of subscribers 7 are connected to the first local exchange 1, and a number of subscribers 9 are connected to the second local exchange 3. The transit exchange is connected to an address table 11, comprising two columns 11a, 11b. The first column 11a holds the subscriber numbers; the second column 11b holds information about the exchange at which each subscriber number is found. When a first subscriber 7 calls a second subscriber 9, the local exchange 1 to which the first subscriber 7 is connected first checks if the second subscriber 9 is also connected to the same local exchange. If this is the case, the connection is set up; if not, the call is forwarded to the transit exchange 5, which looks up the number in the address table 11. From the address table 11 information is retrieved about the local exchange 3 to which the second subscriber is connected, and the connection is set up.

Figure 2:
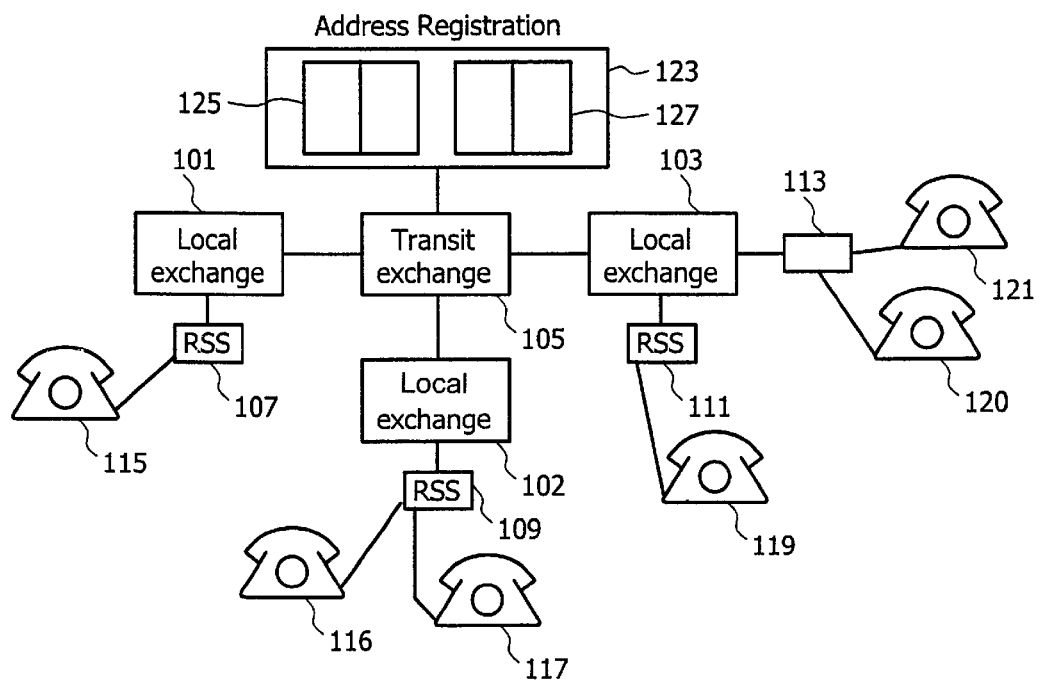
FIG. 2 is a block diagram of a telecommunications network with subscriber stages according to the invention.

FIG. 2 shows an example of a telecommunications network comprising remote subscriber stages according to the invention. In this example, a first 101, a second 102 and a third 103 local exchange are connected to each other through a transit exchange 105. A first remote subscriber stage 107 is connected to the first local exchange 101. A second remote subscriber stage 109 is connected to the second local exchange 102. A third 111 and a fourth 113 remote subscriber stage are connected to the third local exchange 103. A number of subscribers 115 are connected to the first subscriber stage 107. A number of subscribers 116, 117 are connected to the second subscriber stage 109. A number of subscribers 119 are connected to the third subscriber stage 111. A number of subscribers 120, 121 are connected to the fourth subscriber stage 113.

In the normal case, for example, the first remote subscriber stage 107 were to be moved to another local exchange, each subscriber would have to be moved individually. According to the invention, an address registration means 123 is introduced comprising two tables 125 and 127. The tables are shown in detail in FIGS. 3A and 3B. The first table 125 comprises information about what remote subscriber stage each subscriber connected to. The second table 127 comprises information about what local exchange each remote subscriber stage is connected to.

Thus, to move an RSS to another local exchange, only one table entry has to be changed. In addition, of course, the physical connection from the RSS must be moved to the other local exchange, which is a much less time consuming action than moving the subscribers. This is useful when an exchange is to be repaired or replaced, or is temporarily out of service.

FIG. 3A shows an example of the first table 125, as it would look for the system illustrated in FIG. 2. Each subscriber has an entry in the table, stating to which RSS the subscriber is connected. As can be seen from the table, the first subscriber 115 is connected to the first RSS 107, subscribers 116 and 117 are both connected to the second RSS 109, and so on.

FIG. 3B shows an example of the second table 127 as it would look for the system illustrated in FIG. 2. Each RSS has an entry in the table, stating to which local exchange the RSS is connected. As can be seen from the table, the first RSS 107 is connected to the first local exchange 101, the second RSS is connected to the second local exchange 102, and the third and fourth RSSs are connected to the third local exchange 103.

As will be obvious to the skilled person, the networks shown in FIGS. 1 and 2 may comprise different types and any number of exchanges. More than one exchange may be connected to the address table and able to look up addresses directly. The address registration means need not be a separate node; it may be implemented as part of another node, for example a service control point or an intelligent periphery in an intelligent network.

The moving of an RSS from a first to a second local exchange may be performed according to a predetermined scheme. A time may be set for the moving of the subscribers, for example by adding a third table to the address registration means 123. This table would comprise, for each RSS, information about the time of the switch to be made and the time to switch back to the first local exchange. The physical connections may also be changed automatically by configuring the network in such a way that the connection from the RSS to the local exchange could be changed. This can be done in several ways: the simplest solution would be to use a common switch or selector to select one of two cables. A more complex solution would be to connect the RSSs via another exchange, for example, an Asynchronous Transfer Mode (ATM) exchange.

If important subscribers such as the police or the parliament are connected through RSSs, the connections may be made more reliable by automatically moving the RSS to another exchange if the exchange to which they are connected fails for some reason.

Figure 4:
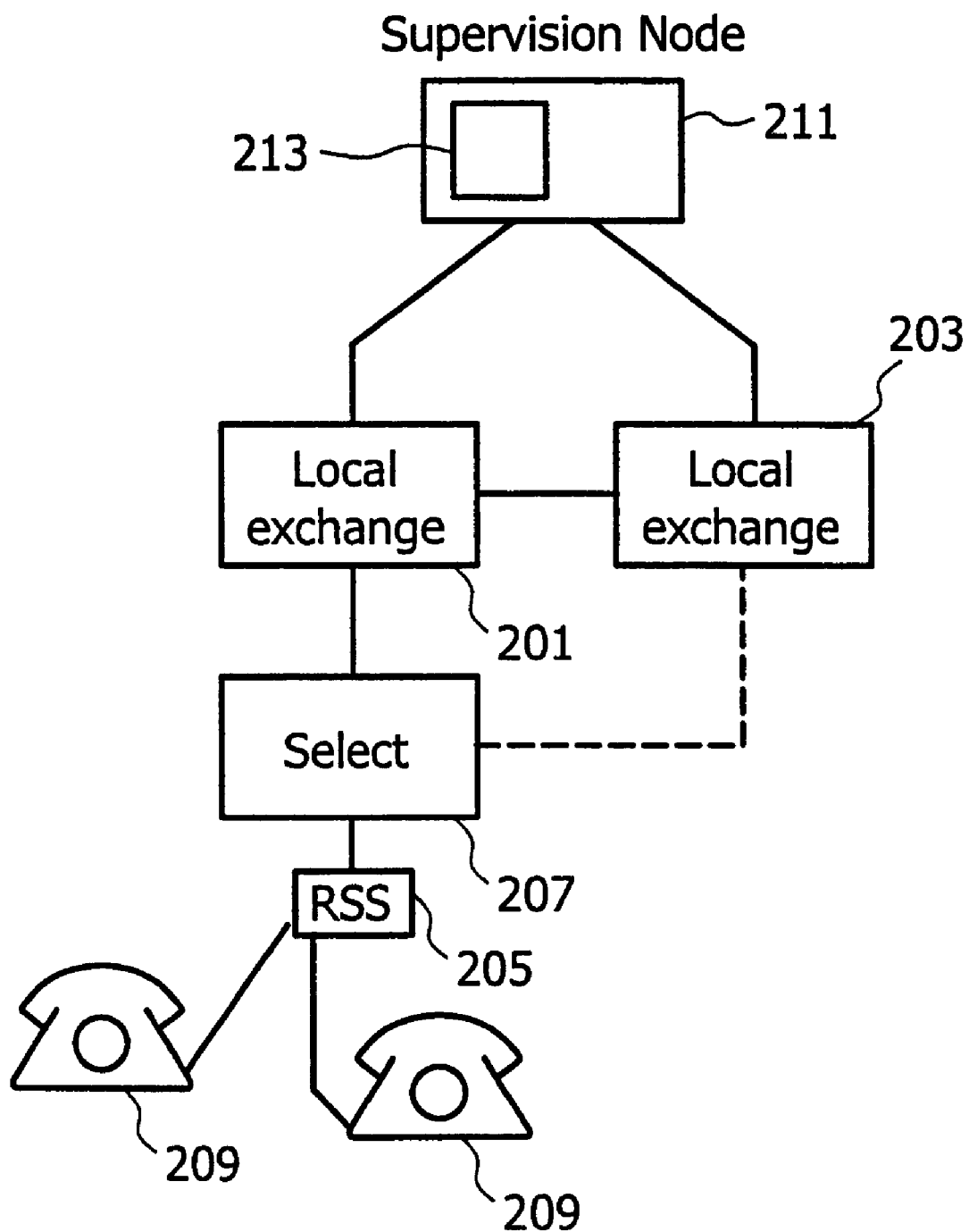
FIG. 4 shows a telecommunications network according to one embodiment of the invention.

One way to implement this is shown in FIG. 4. A first 201 and a second 203 local exchange are connected to each other. Other exchanges may be present in the network but are not shown. An RSS 205 is connected to a selecting means 207 which may be used to connect the RSS to one of the two local exchanges 201, 203. A number of subscribers 209 are connected to the RSS 205. A supervision node 211 monitors all local exchanges having such important subscribers connected to them, for example, by registering signals transmitted from the exchanges to confirm that they are OK. An address table 213 similar to the one 123 in FIG. 2, is preferably located in the supervision node 211. If the exchange 201 fails to transmit such an "OK" signal, the RSS 205 is automatically moved to the other exchange 203 if this exchange is still OK. The command to move the RSS 205 is executed automatically, and the physical connections are switched automatically by means of the selecting means 207.

In this application, as well as the previous one, the physical connection might be changed manually or automatically. If it is changed manually, the selecting means 207 is not needed. If manual work is to be done, an alarm may be needed to inform the maintenance personnel that a connection needs to be changed.

Either way, of course the event will have to be registered in the way common in the art. The RSS may be moved back to the first exchange automatically when this exchange is again functioning, or the connection to the second exchange may be kept until it is manually changed.

Figure 5:
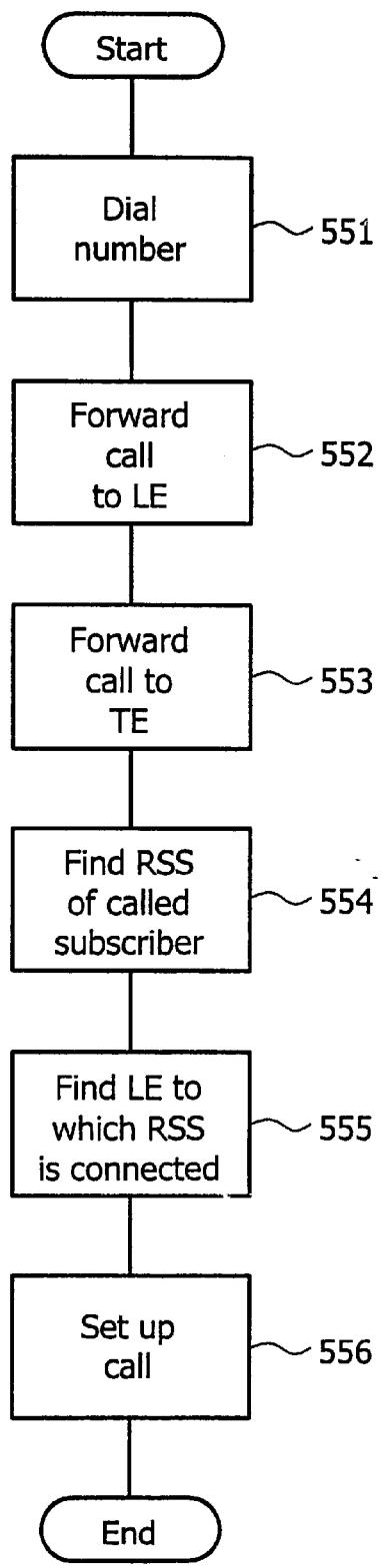
FIG. 5 is a flow chart of the actions performed to set up a call in a system according to the invention.

Calls are set up in the network shown in FIG. 2 according to the following, with reference to FIG. 5:

Step S51: The first subscriber 115 dials the desired number, in this case to the second subscriber 116.

Step S52: The RSS 107 checks if the dialled number is found in the same RSS. As this is not the case, the call is forwarded to the local exchange 101 to which the RSS 107 is connected.

Step S53: The local exchange 101 checks if the dialled number is found in the same local exchange or in any other RSS connected to it. As this is not AS the case, the call is forwarded to the transit exchange 105.

Step S54: The transit exchange looks up the subscriber number in the first table 125 and finds the RSS 109 to which the subscriber 116 is connected.

Step S55: The transit exchange looks up the RSS 109 in the second table 127 and finds the local exchange 102 to which the RSS 109 is connected.

Step S56: The call is set up, in a way common in the art, between the first subscriber 115 and the second subscriber through the local exchange and the RSS identified in steps S44 and S45.

What is claimed is:

1. An address registration means for use in a telecommunications network in which subscribers are connected to remote subscriber stages, said remote subscriber stages being connected to local exchanges, the address registration means comprising:

a first table providing information for subscribers identifying which of the remote subscriber stages each subscriber is connected to, and a second table providing information identifying which of the local exchanges each of the remote subscriber stages is connected to, said address registration means being adapted to move a connection between at least one of the remote subscriber stages and a first local exchange to a second local exchange by updating a respective entry in the second table for the at least one of the remote subscriber stages to identify the connection to the second local exchange, wherein all subscribers connected to the first local exchange via the at least one remote subscriber stage are connected to the second local exchange.

2. A supervision node in a telecommunications network connected to at least one local exchange, the at least one local exchange being further connected to at least one remote subscriber stage having at least one subscriber connected to it, said supervision node for receiving information from the at least one local exchange about the state of the local exchange, the supervision node comprising an address registration means, comprising:

a first table providing information for the at least one subscriber identifying the at least one remote subscriber stage to which the at least one subscriber is connected, and a second table providing information identifying the at least one local exchange to which the at least one remote subscriber stage is connected, wherein said supervision node is adapted to move a connection between the at least one remote subscriber stage and a failed local exchange to another local exchange if the at least one local exchange to which the at least one remote subscriber stage is connected fails.

3. A supervision node in a telecommunications network connected to at least one local exchange, the at least one local exchange being further connected to at least one remote subscriber stage through a selector, said at least one remote subscriber stage being further connected to at least one subscriber, said supervision node for receiving information from the at least one local exchange about the state of the local exchange, and comprising:

an address registration means, comprising
a first table providing information for the at least one subscriber identifying the at least one remote subscriber stage to which the at least one subscriber is connected,
a second table providing information identifying the at least one local exchange to which the at least one remote subscriber stage is connected, wherein if a first local exchange to which the at least one remote subscriber stage is connected fails, the supervision node moves a connection between the at least one remote subscriber stage and the first local exchange to a second local exchange; and instructs the selector to change the physical connection of the at least one remote subscriber stage to said second local exchange.

4. A method in a telecommunications network in which subscribers are connected to remote subscriber stages that are in turn connected to local exchanges, said method comprising the steps of:

providing a first table holding information for subscribers connected identifying which of the remote subscriber stages each subscriber is connected to, providing a second table holding information identifying which of the local exchanges each of the remote subscriber stages is connected to, moving a connection between one of the remote subscriber stages and a first local exchange to another local exchange, and changing a table entry in one of the tables based on the step of moving a connection to another local exchange.

5. The method according to claim 4, wherein an entry of the local exchange in the second table corresponding to the one of the remote subscriber stages moved is changed from the first local exchange to the another local exchange.

6. The method according to claim 4, wherein the table entry is changed automatically at a predetermined time.

7. The method according to claim 4, further comprising:

providing a supervision node in the network, supervising the state of at least one local exchange in the network, and changing a table entry specifying a remote subscriber stage connection to a local exchange automatically if the local exchange to which the remote subscriber stage is connected fails.

8. A method for setting up a connection in a telecommunications network in which subscribers are connected to remote subscriber stations that are in turn connected to local exchanges, said method comprising the steps of:

providing a first table holding information for subscribers identifying which of the remote subscriber stages each subscriber is connected to, providing a second table holding information identifying which of the local exchanges each of the remote subscriber stages is connected to, and when a calling subscriber in the network dials a number located a remote subscriber stage to make a call, performing the steps of looking up the number in the first table to identify a remote subscriber stage to which the call should be directed, finding a corresponding local exchange to which the identified remote subscriber stage is connected in the second table, and setting up the call between said calling subscriber and the called number through the local exchange and the identified remote subscriber stage.

* * * * *